United States Patent [19]

Paynter

[11] Patent Number: 4,751,869

[45] Date of Patent: Jun. 21, 1988

[54] HIGH PRESSURE FLUID-DRIVEN TENSION ACTUATORS AND METHOD FOR CONSTRUCTING THEM

[76] Inventor: Henry M. Paynter, 35 Scotland Rd., Reading, Mass. 01867

[21] Appl. No.: 754,523

[22] Filed: Jul. 12, 1985

[51] Int. Cl.$^4$ ............................................. F01B 19/00
[52] U.S. Cl. ........................................ 92/92; 92/103 F
[58] Field of Search .................. 92/92, 103 F, 47, 91, 92/89, 90

[56] References Cited

U.S. PATENT DOCUMENTS

| | | | |
|---|---|---|---|
| 2,789,580 | 4/1957 | Woods | 137/777 |
| 2,844,126 | 7/1958 | Gaylord | 92/90 |
| 2,865,419 | 12/1958 | Cunningham | 150/1 |
| 3,075,624 | 1/1963 | Fawick | 92/92 |
| 3,255,677 | 6/1966 | Hesse | 92/92 |
| 3,262,446 | 7/1966 | Stoner | 92/92 |
| 3,442,292 | 5/1969 | Jacuzzi | 92/92 |
| 3,481,254 | 12/1969 | Wetherbee, Jr. | 92/92 |
| 3,561,330 | 2/1971 | Rich | 92/92 |
| 3,638,536 | 2/1972 | Kleinwachter | 92/92 |
| 3,645,173 | 2/1972 | Yarlott | 92/92 |
| 4,189,985 | 2/1980 | Harris | 92/153 |

FOREIGN PATENT DOCUMENTS

674031 12/1947 United Kingdom .

Primary Examiner—Abraham Hershkovitz
Attorney, Agent, or Firm—Parmelee, Bollinger & Bramblett

[57] ABSTRACT

High pressure, fluid-driven tension actuators, axially contractible upon inflation by a suitable fluid such as compressed air to convert fluid pressure energy into linear contraction displacement, employ nearly spherical shell surfaces when inflated constrained by meridian and parallel elements. The inflatable shells are formed of elastomeric resilient material, and the constraining elements in certain embodiments of the invention comprise a reinforcing, tubular, knitted, fabric sleeve that axially encompasses, conforms to, and is bonded to a resilient, hollow bladder which defines a fluid chamber having at least one conduit connected at a polar location to bladder and sleeve for inflating and deflating the chamber. The parallel and meridian elements for constraining the elastomeric resilient shell include a generally square constraining pattern extending in an equatorial band around the shell upon inflation of the nearly spherical shell. The constraining elements serve to define an outer limit to spherical expansion of the bladder or shell and reinforce the bladder against rupture upon inflation by high pressure fluid, and the energy for the actuator to return to its initial formed shape is derived from the shear of each region of the shell and the bending of the elastomeric material.

11 Claims, 5 Drawing Sheets

HIGH PRESSURE FLUID-DRIVEN TENSION ACTUATORS AND METHOD FOR CONSTRUCTING THEM

BACKGROUND

This invention relates to high pressure, fluid-driven tension actuators and the method for constructing such actuators. Tension actuators convert fluid pressure energy input, for example such as compressed air energy, into mechanical output. More specifically, they convert fluid pressure energy into linear contraction displacement.

The general purpose of the present invention is to provide novel tension actuators capable of inflation to a high pressure and methods for making such actuators. Further, the invention provides such actuators capable of high-frequency operation, i.e., numerous cycles of inflation and deflation per second, and capable of being actuated over a wide range of operating pressures, in a safe manner.

As I have used the term "high pressure" in this field of tension actuators, it means having a pressure of at least two atmospheres or more, i.e., more than 29 pounds per square inch.

The concept of a tension actuator which contracts along its longitudinal axis when inflated is known. Such an actuator, which responds at relatively low fluid pressure, is disclosed in U.S. Pat. No. 3,645,173—Yarlott. That fluid actuator is described as operating at 0.25 pounds per square inch. Another device which axially contracts upon inflation is disclosed in British Pat. No. 674,031—Morin. U.S. Pat. No. 3,638,536—Kleinwachter et al discloses diaphragm devices for transforming a fluid pressure into torsional movement or into axial movement upon inflation. U.S. Pat. No. 2,789,580—Woods discloses a mechanical transducer with an expansible cavity formed by a flexible seal having a cylindrical braided or woven metal sheath encompassing it.

U.S. Pat. No. 2,865,419—Cunningham has been reviewed by the present inventor and is considered even more remote from the present invention than the above disclosures. It is set forth as being known to the inventor in order for this list of known disclosures to be complete and in the event the reader might consider it to be of interest.

SUMMARY OF THE DISCLOSURE

In one preferred embodiment of the high pressure, fluid-driven tension actuator of the present invention, to be described hereinbelow in detail, a resilient, hollow, tubular bladder having a generally spherical, enlarged central portion and defining a fluid chamber is reinforced and controlled in shape by an encompassing and conforming contour knitted, fabric sleeve providing constraining meridians and parallels. The knitted sleeve also is tubular having a generally spherical, enlarged central portion. At least one rigid fluid conduit is connected at an axial end location to the bladder and sleeve and provides fluid communication with the chamber. The knitted sleeve serves to define an outer limit to radial expansion of the tubular bladder and reinforces the bladder against rupture upon inflation by high pressure fluid.

The tubular bladder and the knitted sleeve are bonded together with a bonding material which coats the sleeve and is cured to form an integrally bonded structure.

In one preferred embodiment of the method of the present invention for constructing these high pressure, fluid-driven tension actuators the knitted sleeve is first pulled onto the tubular bladder. The fluid conduits are inserted into and bound to the bladder and sleeve. The assembly is then inflated and the bladder and sleeve is coated with a bonding material, which coats the knitted sleeve. This material is dried in a stream of hot, flowing air. The assembly is then deflated and pulled into an axially elongated configuration. It is inserted into an axially fluted mold where it is inflated so that its exterior conforms to the interior of the mold. There the bonding material is cured at an elevated temperature below the bonding material's melting temperature.

The constraining elements as meridians and parallels include a constraining pattern of squares extending in an equatorial band around the equator of the nearly spherical actuator, when the shell is inflated for causing the shell to be contracted in its axial, pole-to-pole distance.

Accordingly, it is an object of the present invention to provide unique and novel high pressure, fluid-driven tension actuators which axially contract upon inflation to convert fluid pressure energy into linear contraction displacement.

Another object of the present invention is to provide unique and novel methods for constructing these high pressure tension actuators simply and inexpensively.

Among the many advantages of the present invention are those resulting from the fact that tension actuators embodying the present invention can be operated at pressures of at least two atmospheres or more so as to provide a relatively powerful contraction force in proportion to the sizes of the actuators. Moreover, they can normally be operated for many hundreds of thousands of cyles of operation without failure. Thus, they provide a reliable long operating life in spite of the fact that they are operating at pressures of at least two atmospheres.

As used herein the term "cycle of operation" or "cycle" means an inflation plus a deflation (or conversely means a deflation plus an inflation) such that at the the completion of the cycle the actuator has returned to the same state as at the initiation of the cycle.

BRIEF DESCRIPTION OF THE DRAWINGS

The invention, together with further objects, features, aspects and advantages thereof will be more fully understood from a consideration of the following description taken in conjunction with the accompanying drawings in which like elements are designated with the same reference numerals throughout the various views. Also, the various elements are not necessarily illustrated to scale in order to enhance understanding and more clearly show and describe the invention.

DESCRIPTION OF THE PREFERRED EMBODIMENT OF THE HIGH PRESSURE TENSION ACTUATOR AND THE METHOD FOR ITS CONSTRUCTION

Figure 1:
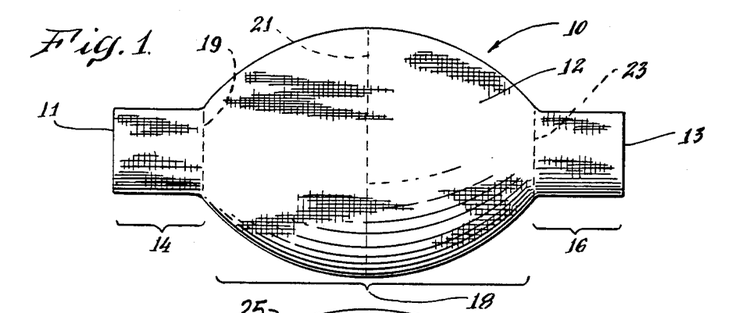
FIG. 1 is a side elevational view of a tubular, contoured, knitted, fabric sleeve, having an enlarged, generally spherical central portion, which is used in construction of a high pressure, fluid-driven tension actuator embodying the present invention.
Figure 2:
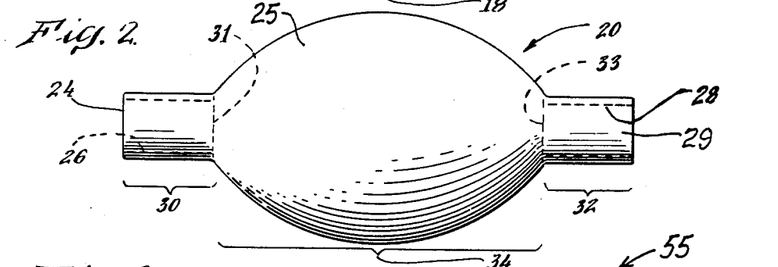
FIG. 2 is a side elevational view of a hollow, tubular bladder, having an enlarged, generally spherical central portion, which is used in construction of this tension actuator.
Figure 3:
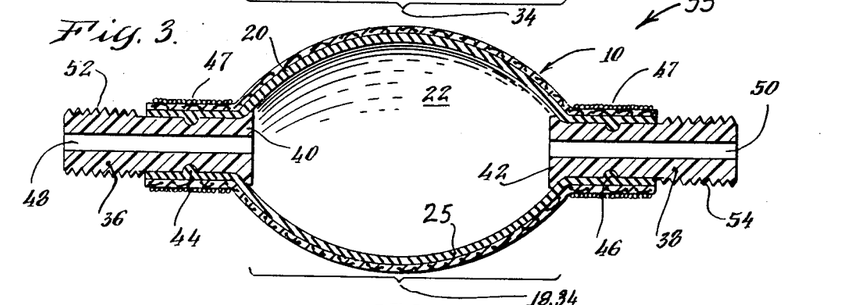
FIG. 3 is a cross sectional view of the assembled sleeve and bladder with a pair of rigid fluid conduits installed and bound to them at opposite axial ends.

The components of the high pressure, fluid-driven, tension actuator embodying the present invention in a presently preferred arrangement are illustrated in FIGS. 1, 2, and 3. FIG. 1 shows in detail the tubular, contoured knitted, fabric sleeve 10 which is used to reinforce and control in shape the wall of an assembled tension actuator. This sleeve 10 may be fabricated from a strand made of any suitably strong, tough flexible fiber such as a synthetic yarn, e.g. Dacron. Further, the net or mesh 12 of the tubular sleeve 10 is circumferentially continuous in the same manner as is the wall of a stocking or sock, being cut only at its axial ends 11 and 13, namely near the polar regions of the generally spherical shape. The sleeve is knit from a strand of the constituent fiber in what is generally known as a continuous tubular knit pattern, as shown and explained in detail below with reference to FIGS. 5 and 6. This contoured sleeve 10 is formed in three sections 14, 16, and 18 as will be explained.

The term "strand" is intended to include an elongated continuous element made from the desired fiber and suitable for knitting. Thus, for example, a "strand" may mean a thread, cord, string, filament, line, yarn, twine, or the like. The strand in the leading and trailing cylindrical sections of the sleeve, 14 and 16 respectively, is relatively tightly knitted with a uniform size of small knitting loops to form the reduced diameter cylindrical end sections 14 and 16. Therefore, these end sections are relatively constricted, having a relatively small uniform diameter. The strand in the central spherical section 18 is more loosely knitted, giving this section a consequently larger diameter.

Hence, the knitted strand is first uniformly knitted with small loops at the sleeve's leading section 14. It becomes progressively more loosely knitted i.e., with larger knitted loops commencing at the junction or shoulder 19 between sections 14 and 18 and continuing over to the central great circle 21 i.e., the equator, of the spherical section 18. Then the knitting again becomes progressively tighter, with progressively smaller loops, until the other junction or shoulder 23 is reached adjacent to the end section 16. Then the trailing end section 16 is uniformly tightly knitted with small knitting loops of the same size as in the other section 14 to form an end cylinder of the same diameter. This progressive tight-loose-tight knitted strand pattern gives the sleeve 10 a contoured configuration so that the central section 18 has an enlarged, generally spherical shape. However, all sections of the knitted sleeve form a close network of supporting interlocked loops of the strand, that is, the sleeve forms a close mesh reinforcement for that which it supports. Consequently, the sleeve mesh provides the bladder wall with substantially continuous reinforcement.

A hollow, tubular bladder 20, i.e., the elastomeric resilient flexible shell, which is to be reinforced by the grid or net 12 provided by the knitted sleeve 10 is shown in FIG. 2. This bladder 20, which defines an actuator fluid chamber 22 as shown in FIG. 3, is made of a suitably resilient, flexible, elastomeric material so that it may be inflated when filled with pressurized fluid. In practice, for example, neoprene rubber has been found satisfactory. The bladder wall 25 is also circumerentially continuous and defines two cylindrical end portals 26 and 28 at the leading and trailing ends of the bladder 20, which are considered to be at the polar regions of the globe. The bladder 20 is of contoured configuration, similar to that of the knitted sleeve, having relatively small diameter cylindrical leading and trailing tubular end sections 24 and 29, at the polar regions, respectively, and an enlarged diameter generally spherical central section 34 which is joined to the end sections 30 and 32 at junction or shoulder regions 31 and 33, respectively.

FIG. 3 illustrates in detail how the sleeve 10 encompasses and conforms to the bladder 20 when the two components are assembled. The tubular end sections of the sleeve are telescoped over the tubular end sections of the bladder. This assembly further includes rigid coupling members 36 and 38 respectively, for example of strong, rigid plastic such as polycarbonate, Delrin acetal resin, nylon, high density polypropylene, which are inserted into the respective portals 26 and 28 in the bladder 20. The inner end of each coupling member 36, 39 inserted into the bladder 20 is provided with a radially outwardly projecting flange 40 and 42, and axially spaced from this flange is a radially inwardly recessed groove 44 and 46. The bladder 20, sleeve 10 and the coupling members 36 and 38 are tightly secured together by binding the leading and trailing bladder and sleeve sections with a suitable, closely wound serving strand 47 so that the bladder and sleeve sections tightly embrace the coupling flanges 40 and 42 and the grooves 44 and 46 in air-tight relationship with respect to preventing leakage from the chamber 22. The inner surface of the bladder thus forms a fluid tight seal with the outer surface of these rigid coupling members.

At least one of these rigid coupling members 36 and 38 is further provided with a fluid flow passage 48 or 50 to form a conduit so that pressurized fluid may be pumped into and exhausted from the internal chamber 22. Screw threads 52 and 54 are formed on the outwardly projecting ends of the coupling members so that a source of pressurized fluid (not shown) such as compressed air may readily be screw coupled to at least one end, and apparatus to be driven may be easily screw coupled to both ends of this high pressure tension actuator 55.

Figure 4:
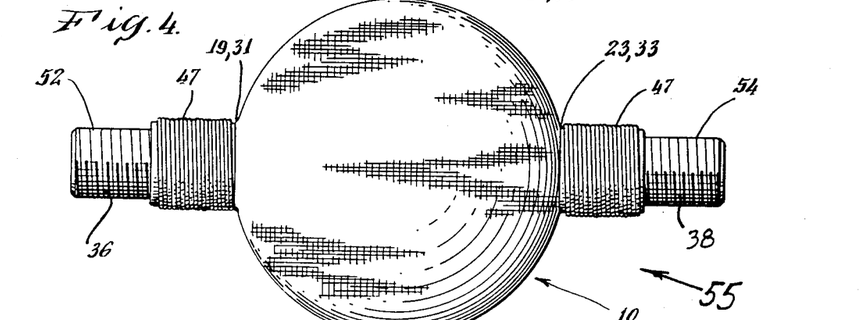
FIG. 4 is a side elevation of the inflated assembly that has been coated with a bonding material which bonds the sleeve sleeve and the bladder together.

FIG. 4 shows a high pressure, fluid-driven tension actuator 55, constructed in accordance with the present invention, in its inflated, axially contracted state. The knitted fabric sleeve 10 defines an outer limit to radial expansion of the encompassed hollow bladder when the actuator is so inflated. The close mesh, knitted character of the sleeve causes it to provide effectively complete encompassing reinforcement to the bladder. Therefore, the bladder's tendency to burst upon inflation by high pressure fluid is reduced since there are no large areas of bladder wall 25 (FIG. 3) which are unsupported.

In practice, it has been found that tension actuators constructed in accordance with the present invention can be safely and advantageously operated at pressure up to 125 pounds per square inch (8.3 atmospheres). It is to be noted that the usual range of "shop air" pressure is about 90 to 120 p.s.i., gauge as produced by a single stage air compressor. Additionally, the effectively complete, encompassing reinforcement that the knitted fabric sleeve 10 provides for the hollow bladder 20 reduces the tendency of the bladder to deteriorate when frequently inflated at high pressure, that is, over many cycles of operation. Therefore, the strength of these tension actuators and the power that they develop will give them great utility in many applications.

These high pressure tension actuators 55 axially contract upon inflation because the knitted sleeve 10 is effectively non-extensible. When the central section 18, 34 is inflated into a spherical shape its axial length is correspondingly reduced due to the fact that the knitted mesh is now surrounding a spherical volume.

Figure 5:
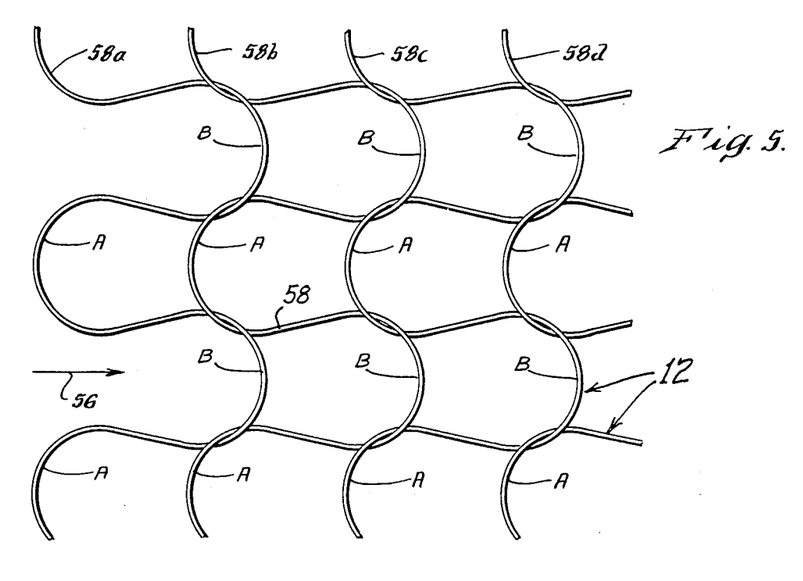
FIG. 5 is an enlarged view of a section of the relaxed, generally spherical portion of the knitted fabric sleeve. It illustrates the configuration of the knitted fabric in a relaxed condition before bonding.

FIG. 5 illustrates on enlarged scale a small portion of the equatorial region 21 (FIG. 1) of the spherical knitted net or mesh section 18 as it appears before bonding when the actuator is deflated and axially elongated, where the axial, pole-to-pole, direction is indicated by the arrow 56. The net or mesh 12 is comprised of a series of interlocked loops of one continuous strand 58 formed by the knitting technique commonly defined as simple (or plain) knitting, as distinguished from complex or fancy knitting techniques, for example such as tricot, rib or spiral knitting. These interlocked loops assume an "S" shape when knitted together to form a series of pairs of adjacent U-shaped loops. In simple knitting the "wale" is the direction along the length of the continuous strand and the "course" is the axial direction 56 of the knit sleeve 10. Four successive passes (courses) of the strand 58 are shown and are respectively indicated 58a, 58b, 58c and 58d. The first series of adjacent U-shaped loops in each pass is indicated at A; the second series of U-shaped loops in this same pass is indicated at B. Each A loop in pass 58c interlocks two B loops in pass 58b, and each B loop in pass 58b interlocks two A loops in pass 58c. Similarly, each A loop in pass 58b interlocks two B loops in pass 58a and each B loop in pass 58a interlocks two A loops in pass 58b. This simple knitted mesh pattern is repetitive throughout the fabric sleeve length.

In the equatorial region 21 (FIG. 1) of mesh 12, the successive passes (courses) 58a, 58b, 58c and 58d form loops which are all substantially the same size. However, it will be understood that in progressing in each axial direction from the equatorial region 21 toward the respective knitted shoulder regions 19 and 23, the loops A and B (FIG. 5) of each successive pass of the knitted strand become progressively smaller. This progressive change in the knit pattern in going in each axial direction from the equatorial region 21 toward the polar shoulder regions 19 and 23 is illustrated schematically and enlarged in FIG. 12 in a fully inflated actuator 55, showing the resultant net or mesh pattern of meridians 59 and parallels 61 of the constraining network 12. Near the equatorial region 21 the constraining elements define generally an equatorial band of squares, when the bladder is fully inflated as shown in FIG. 12, and they define generally sequential bands of progressively smaller trapezoids each having progressively smaller pairs of acute angles at two corners and progressively larger pairs of obtuse angles at their other two corners as seen in FIG. 12.

These squares and trapezoids are each called individual "cells" of the net (mesh) 12. As a practical matter the knit cell size varies over a range of about five-to-one in going from the cylindrical end sections 14, 16 to the equatorial region 21.

Figure 6:
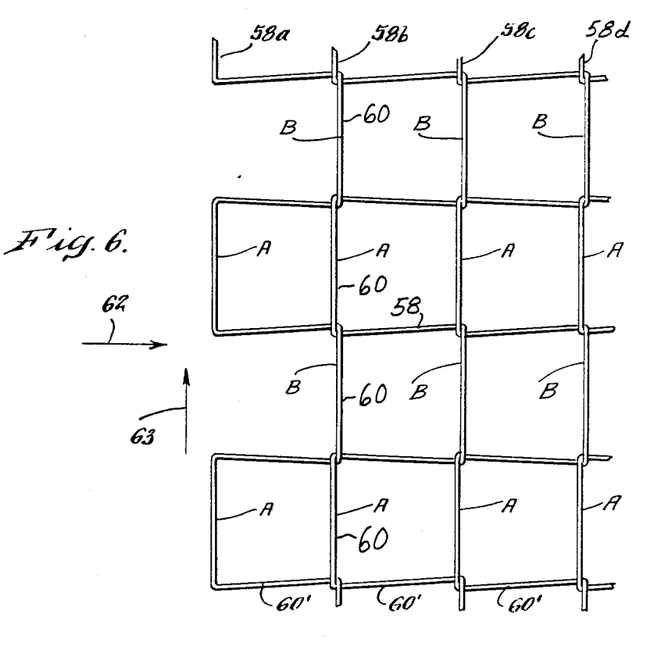
FIG. 6 is an enlarged view of the same section of the knitted fabric sleeve illustrating its configuration when the tension actuator is inflated and axially contracted. The fabric is coated with bonding material, and bonded to the bladder in this square configuration.
Figure 12:
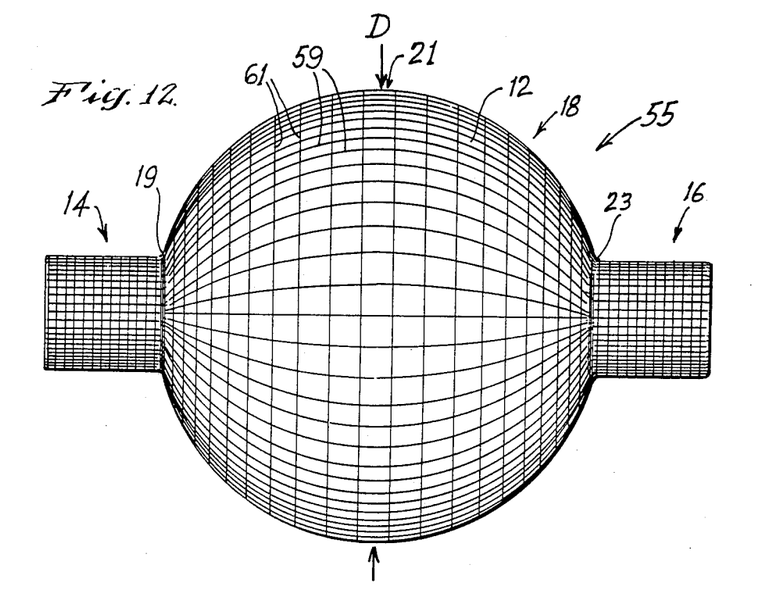
FIG. 12 illustrates the enlarged mesh or net pattern in the spherical and end sections of the actuator formed by the meridians and parallels of the constraining elements.

When the tension actuator is inflated at high fluid pressure as shown in FIGS. 4 and 12, a radial force acting through the bladder 20 causes the knitted fabric sleeve in its equatorial region 21 to assume a configuration such as that shown in FIG. 6. In this case, the various U-shaped loops have become almost square with almost square corners with no significant slack either in a circumferential (wale) direction 62 or in an axial (course) direction 63 as indicated.

The knitted sleeve is bonded to the bladder when it is in its taut state as shown in FIGS. 6 and 12.

A strand 58 which has been found to work to advantage in the knitted sleeve 10 is a Dacron polyester strand or a "Kevlar" (du Pont Trademark) polymeric strand.

METHOD OF CONSTRUCTION

Figure 7:
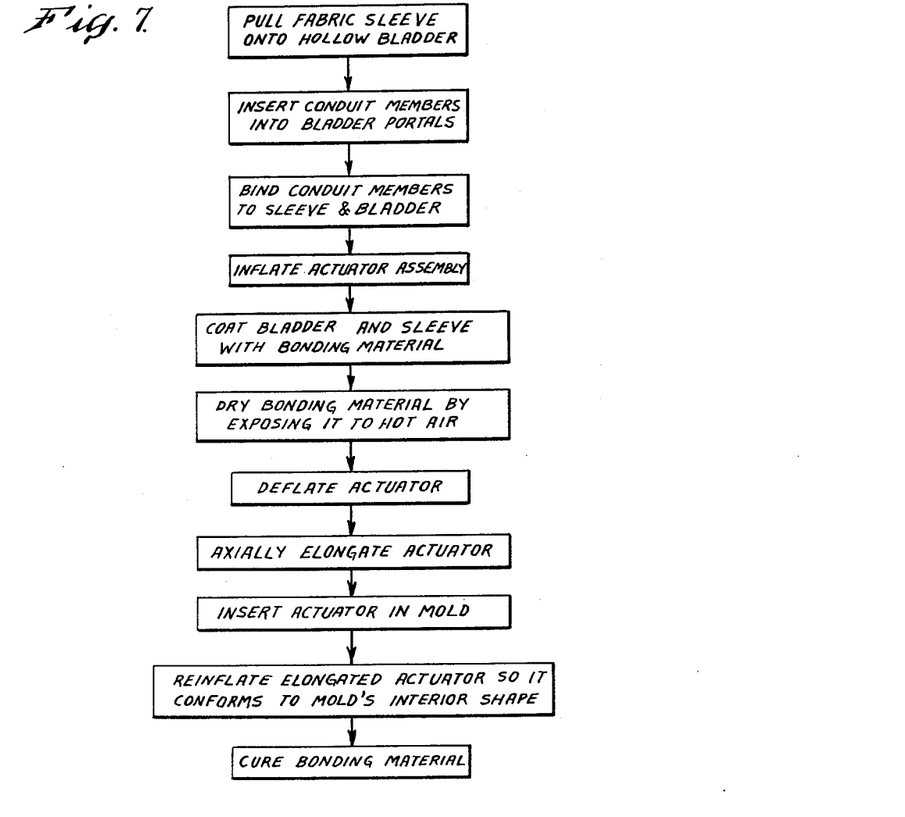
FIG. 7 is a processing chart schematically illustrating the steps of the method of the present invention employed to construct these high pressure tension actuators.

The method of constructing the high pressure fluid-driven tension actuators 55 of the present invention will be explained with the reference to FIG. 7 where the steps of this method are diagramatically represented. The reinforcing tubular knitted fabric sleeve 10 is first pulled onto and into encompassing relation with the hollow resilient flexible elastomeric bladder 20. The rigid coupling and conduit members 36 and 38 are inserted into the respective bladder portals 26 and 28 so that the bladder wall 24 covers both the flanges 40 and 42 and the grooves 44 and 46. The knitted sleeve 10, the hollow bladder 20 and the rigid members 36 and 38 are tightly bound together by closely winding the binding strand 47 forming a serving wrapped about them providing a strong, air-tight fastening binding to these coupling members 36, 8.

After this stage in actuator assembly, shown in detail in FIG. 3, the actuator is then inflated to its maximum operating size FIGS. 4 and 12, by connecting one conduit and coupling member 36 or 38 to a source of pressurized operating fluid (not shown) and by connecting a sealing cap (not shown) to the other coupling member. The fully inflated actuator is shown in FIGS. 4 and 12.

All slack in the interlocking loops in the knitted fabric sleeve, as indicated in FIG. 5 is now taken up, and the loops become taut and essentially square cornered as shown in FIG. 6.

The entire sleeve-bladder assembly is then coated with a bonding material which coats the sleeve 10. It has been found that suitable bonding material can be selected from the group of bonding materials consisting of latex compounds, neoprene, and silicone rubber. The bonding material is then initially set or dried for example by being exposed to and thus dried by a stream of hot air, while the actuator remains fully inflated. In this manner, the knitted fabric sleeve is held in its taut posture. After drying, the tension actuator is deflated and axially elongated as shown by the arrows 64 in FIG. 8.

Figure 8:
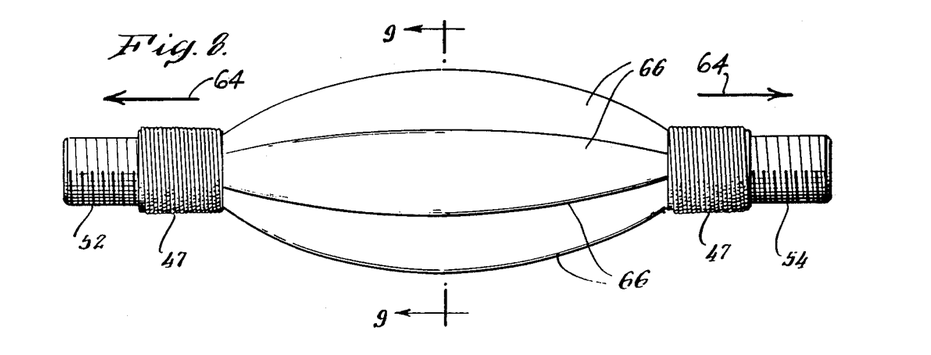
FIG. 8 is a side elevational view of the deflated, elongated assembled tension actuator after it has been coated with the bonding material and cured e.g., set, dried, reacted or polymerized.
Figure 9:
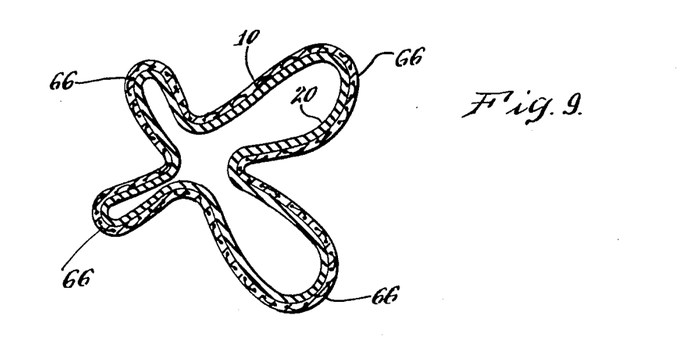
FIG. 9 is a cross sectional view of this tension actuator taken through the plane 9—9 of FIG. 8 looking toward the left, illustrating the irregular flutes which may form when the actuator is deflated.

At this time, the bonded knitted fabric and bladder wall assume the appearance illustrated in FIG. 9. Additionally, several flutes 66 naturally form when the actuator is elongated, arrows 64 (FIG. 8). These flutes 66 may be of irregular, assymetrical shape as illustrated in cross section in FIG. 9. Such an irregular condition is undesirable because the maximum elongation 64 is not quite obtained.

Figure 10:
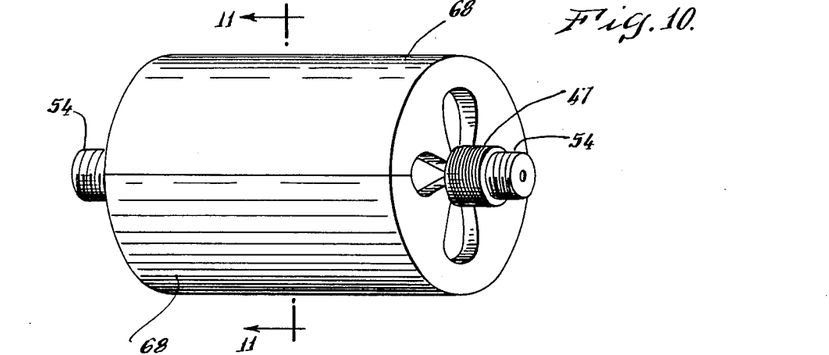
FIG. 10 is an elevational perspective view of a forming mold in which the bonding material may be cured.
Figure 11:
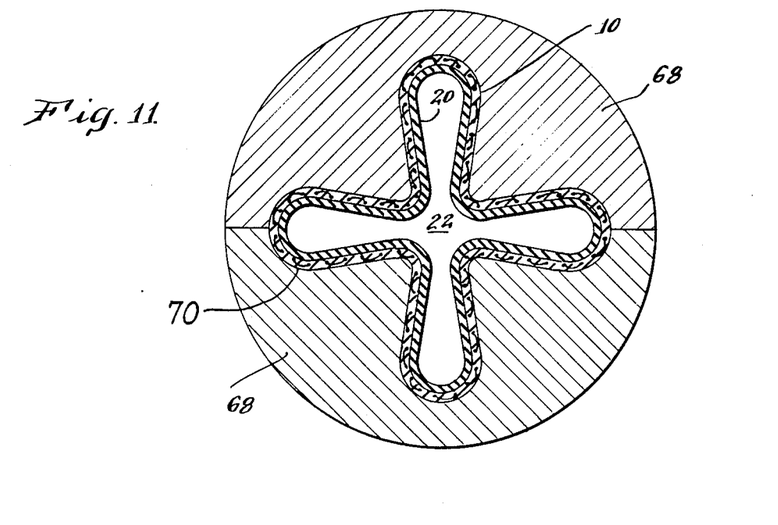
FIG. 11 is an enlarged cross sectional view of this mold taken through plane 11—11 looking toward the left, illustrating the regular, symmetrical flutes which are formed in the tension actuator by the mold during curing under inflation pressure.

If desired as an optional step the bonded actuator assembly is then inserted into a mold 68, shown in FIGS. 10 and 11, which has a regularly fluted interior contour 70. The number of flutes formed is preferably at least four. The present inventor has found that actuators with either 4 or 8 flutes function very well. The elongated tension actuator 55 is then reinflated within the contoured confines 70 of the mold 68 so that the actuator exterior assumes the symmetrical fluted shape of the mold's interior. The previously dried bonding material is then fully cured by heating to its fully-cured setting temperature.

In practice, the actuators employing latex or neoprene or silicone rubber bonding material have been cured at a temperature in the range of 350° to 400° F. Care must be taken, however, not to exceed 400° F. because a higher temperature would be too close to the melting temperature of the bonding material. The curing operation cures the bonding material and sets the coated knitted fabric so that upon deflation it always tends to return to its deflated, elongated symmetrically fluted condition.

This novel method of constructing high pressure, fluid-driven tension actuators 55 is advantageous because it produces actuators which may be operated at high pressure for an extended life, for many hundreds of thousands of operating cycles. Additionally, this method involves a relatively short manufacturing time and only a modest amount of labor.

There are a number of important features and advantages of tension actuators embodying the present invention as compared with the fluid actuator disclosed in the Yarlott patent. In a sphere, as generally achieved by a tension actuator in its fully inflated, axially retracted condition (FIGS. 4 and 12), the curvature is everywhere the same; in a sphere the curvature is the same at all points on the spherical surface. On the other hand, in the prolate spheroidal form of the Yarlott actuator in its axially retracted condition, as seen in FIGS. 3 and 4, the curvatures at different points on the shell 12 are vastly different.

Therefore, in accordance with the present invention, the stresses throughout the bladder or shell wall 25 in the fully inflated state of the chamber 22 are much more nearly uniform than in the shell 12 of the Yarlott actuator.

Moreover, because of the helical configuration of the wound strand 34 in the Yarlott actuator, there are "tumble off" problems near the two neck regions of that actuator. The wound strand 34 tends to be pulled off from the respective longitudinal strands 32 which are disposed within an associated valley 40 when the Yarlott actuator is inflated, tending toward early failure. In other words, the Yarlott actuator is capable of only relatively few operating cycles before failure. In contradistinction to this "tumble off" problem of Yarlott, in accord with the present invention each cell of the net 12 of the knit sleeve 10 is fully stabilized by being looped through the loops which form the adjacent cells, as seen clearly in FIGS. 5 and 6, thus, hundreds of thousands of cycles of operation are provided.

Furthermore, the meridians 59, (FIG. 12) are formed by axially extending portions 60' (FIG. 6) of the respective loops. Then, the parallels 61 (FIG. 12) are formed by circumaxially extending portions 60 of the respective loops. Consequently, advantageously the stresses are uniform. No additional longitudinal nor circumaxial reinforcing strands are needed. The entire constraining net 12 is made in one simple braiding operation.

The Yarlott specification states that the surface area of the shell 12 remains substantially constant in all of the various positions of the actuator. However, that alleged constancy of surface area is only approximated at relatively low internal pressure as shown by the bulges of the shell in FIGS. 3 and 4 between the strands 32 and 34. In other words, the Yarlott actuator in actual practice is limted to an internal pressure when fully inflated of about one atmosphere above the ambient pressure, i.e., about 15 p.s.i. gauge; whereas an actuator embodying the present invention will operate up to a pressure of 125 p.s.i. above ambient pressure, i.e., 125 p.s.i. gauge, because the net 12 does effectively stabilize the shell wall 25 when fully inflated.

In my U.S. Pat. No. 4,108,050 relating to *torsional* actuators it is explained that in such *torsional* actuators there are advantages in having two relationships, namely: (1) the ratio of the axial length to the mid-diameter is equal to 1.0; and (2) the ratio of the end diameter to the mid-diameter is equal to 0.5. In the present *tension* actuator 55 it is preferred that the diameter at each of the shoulder regions 19 and 23 (FIG. 12) be equal to one quarter (0.25D) of the diameter "D" in the fully inflated equatorial region 21 (FIG. 12).

In FIG. 1 the central section 18 of the knitted sleeve 10 is shown somewhat elongated from a sphere. It is to be understood that FIG. 1 is showing a relaxed knitted sleeve. The central section 18, when all slack is removed as shown in FIG. 6, is intended to define a spherical surface without any slack when the internal shell 25 is fully inflated as shown in FIGS. 4 and 12.

Although specific embodiments of the invention have been disclosed herein in detail, it is to be understood that this is for purposes of illustration. This disclosure is not to be construed as limiting the scope of the invention, since the described method and structure may be changed in details by those skilled in the art in order to adapt these high pressure, fluid-driven tension actuators and the method for constructing them to particular applications, without departing from the scope of the following claims and equivalents of the claimed elements.

What is claimed is:

1. A high pressure, fluid-driven tension actuator, axially contractible upon inflation by pressurized fluid to convert fluid pressure energy into linear contraction displacement comprising:
   a resilient, flexible, elastomeric hollow bladder having a wall circumferentially continuous about an axis defining an internal fluid chamber for receiving pressurized fluid and having a pair of axially extending tubular end sections extending from said bladder at opposite ends of said axis and at least one end portal in one of said end sections in fluid communication with said fluid chamber for feeding pressurized fluid into and out of said fluid chamber,
   said bladder having an enlarged generally spherical central section and said end sections being of reduced diameter compared with said enlarged central section,
   a bladder-reinforcing, tubular knitted fabric sleeve,
   said tubular knitted fabric sleeve being knitted of a continuous strand in a plain knit pattern having two tubular end portions and an enlarged central portion of generally spherical configuration of larger diameter than said end portions,
   said central portion of said sleeve being progressively more loosely knitted from each tubular end portion toward an equatorial mid-region of said central portion,
   said tubular knitted fabric sleeve encompassing and conforming to said bladder for providing an outer limit to transverse expansion of said bladder upon inflation by pressurized fluid,
   bonding means bonding said sleeve to said bladder, and
   first and second coupling means secured at opposite end locations in fluid tight relationship to said respective end portions of said sleeve and respective end sections of said bladder for attaching said tension actuator at its opposite ends to apparatus to be driven and for coupling said end portal to a source of pressurized fluid.

2. The high pressure, fluid-driven, tension actuator as claimed in claim 1, wherein said tubular knitted fabric sleeve is a close mesh network for reinforcing said wall of said hollow bladder in an effectively continuous manner for withstanding inflation of said bladder by pressurized fluid in said fluid chamber of more than 29 pounds per square inch pressure.

3. The high-pressure, fluid-driven tension actuator as claimed in claim 2, in which:
   said knitted sleeve is bonded to said bladder while the central spherical section of said bladder is fully inflated into its generally spherical shape, and
   said enlarged spherical central section of said knitted sleeve closely embraces the generally spherical central section of said bladder when the bladder is fully inflated with the strand pulled taut and defining a configuration of adjacent squares encircling the equatorial region of the fully inflated bladder.

4. The high-pressure, fluid-driven tension actuator as claimed in claim 3, in which:
   the ratio of the diameter of the bladder at the junction of each tubular end section to the diameter "D" of the enlarged fully inflated spherical central section is one-quarter.

5. The high-pressure, fluid-driven tension actuator as claimed in claim 3, in which:
   the taut strand of the knit sleeve in its spherical central section forms an encompassing net surrounding the fully inflated spherical central section of the bladder forming meridians and parallels surrounding the fully inflated spherical central section of the bladder.

6. The high-pressure, fluid-driven tension actuator as claimed in claim 5, in which:
   the cell size of the knit sleeve in its enlarged spherical central section varies over a size range of about five to one in progressing from the equatorial region to each tubular end portion.

7. The high-pressure, fluid-driven tension actuator as claimed in claim 4, in which:
   the cell size of the knit sleeve in its enlarged spherical central section varies over a size range of about five to one in progressing from the equatorial region to each tubular end section.

8. A high pressure, fluid-driven, tension actuator, axially contractible upon inflation by pressurized fluid of more than 29 pounds per square inch to convert fluid pressure energy into linear contraction displacement, comprising:
   a resilient elastomeric tubular bladder defining an internal fluid chamber and having a generally spherical enlarged central section and first and second tubular end portals in fluid communication with said internal fluid chamber,
   a bladder-reinforcing tubular contour knitted fabric sleeve axially encompassing and conforming to said bladder and having a generally spherical enlarged central section, said sleeve providing an outer limit to transverse expansion of said enlarged central section of said bladder upon inflation by high pressure fluid, said sleeve being knitted in a continuous strand forming said enlarged central section and two axially extending tubular end sections extending from said enlarged central section,
   bonding means bonding said sleeve to said bladder,
   first and second rigid coupling members mounted at axially opposed ends of said sleeve and said bladder, connected in fluid-tight relationship to said first and second end portals respectively,
   at least one of said coupling members having a fluid flow passage therethrough to provide fluid communication with said internal fluid chamber,
   said spherical central section of said knit sleeve having a plain knitted pattern,
   said strand being pulled taut when the spherical central section of said bladder is fully inflated, and
   said taut strand defining meridians extending in an axial direction between said tubular end sections and parallels extending circumaxially when said spherical central section of said bladder is fully inflated.

9. The high-pressure, fluid-driven tension actuator as claimed in claim 8, in which:
   the cells of the pattern of said knit sleeve vary over a size range of about five-to-one in progressing from the equatorial region of said spherical central section of said knit sleeve when said bladder is fully inflated to said tubular end sections of said knit sleeve.

10. A high pressure, fluid-driven, tension actuator, axially contractible upon inflation to convert fluid pressure energy into linear contraction displacement, comprising:
    a resilient, elastomeric tubular bladder defining an internal fluid chamber and having a generally spherical enlarged central section and two axially extending tubular end sections defining first and second end portals in fluid communication with said internal fluid chamber, and also having a shoulder in the bladder wall at the junction between each of said tubular end sections and said spherical section, a bladder-reinforcing, tubular, contour-knitted fabric sleeve being knitted of a continuous strand forming a generally enlarged spherical central section and two tubular cylindrical end sections axially extending from opposite ends of said central section and also forming a shoulder at the junction between each of said cylindrical end sections and said spherical central section, said sleeve encompassing and conforming to said bladder with said spherical central section of said sleeve surrounding said spherical central section of said bladder and said tubular cylindrical end sections of said sleeve surrounding said tubular end sections of said bladder and with the shoulders in said sleeve being aligned with and encircling the shoulders in said bladder, bonding means bonding said encompassing and conforming sleeve to said bladder, first and second rigid coupling members each extending into the tubular end sections of said bladder and said surrounding sleeve at said first and second end portals respectively, each of said rigid coupling members having a flange on its inner end adjacent the respective shoulders in said bladder and a circumferential groove mated with the inner surface of the tubular end sections of said bladder, at least one of said coupling members having a fluid flow passage therethrough to provide fluid communication with said internal fluid chamber, and a wrapping around the tubular end sections of said bladder and surrounding sleeve securely connecting said tubular end sections of said bladder and sleeve onto said rigid coupling members in fluid-tight relationship.

11. The high-pressure, fluid-driven tension actuator as claimed in claim 10, in which:

said knitted sleeve has a plain knit pattern in its spherical central section, said strand is taut when the spherical central section of the bladder is fully inflated, said plain knit pattern forms a mesh of meridians and parallels encompassing the spherical central section of the fully inflated bladder with an equatorial band of square cells of said knit pattern extending circumferentially around the equatorial region of the fully inflated bladder.

* * * * *